No. 668,262. Patented Feb. 19, 1901.
D. N. MELVIN.
MOTOR VEHICLE.
(Application filed June 14, 1900.)
(No Model.) 4 Sheets—Sheet 3.

WITNESSES:

INVENTOR
David N. Melvin
BY
ATTORNEY

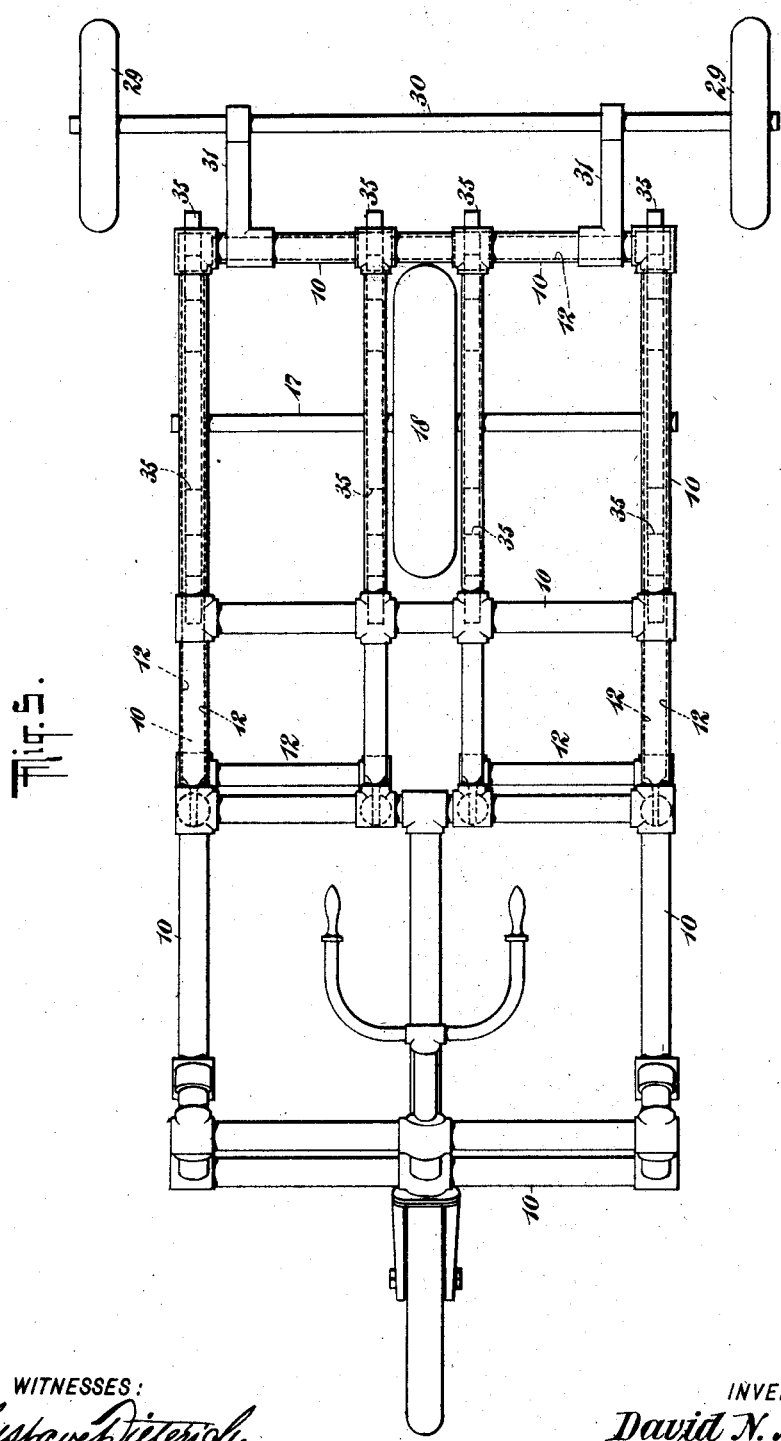

UNITED STATES PATENT OFFICE.

DAVID N. MELVIN, OF LINOLEUMVILLE, NEW YORK.

MOTOR-VEHICLE.

SPECIFICATION forming part of Letters Patent No. 668,262, dated February 19, 1901.

Application filed June 14, 1900. Serial No. 20,252. (No model.)

*To all whom it may concern:*

Be it known that I, DAVID N. MELVIN, a subject of Her Majesty the Queen of Great Britain, and a resident of Linoleumville, in the county of Richmond and State of New York, have invented certain new and useful Improvements in Motor-Vehicles, of which the following is a specification.

The invention relates to improvements in motor-vehicles; and it consists in the novel features, combinations, and arrangement of parts hereinafter described, and particularly pointed out in the claims.

The general object of the invention is to produce a thoroughly efficient automobile which shall be simple of construction, convenient of operation, and comparatively inexpensive of manufacture.

In the preferred embodiment of the invention I combine in one carriage an electric motor fed by storage-cells and a gasolene or hydrocarbon-oil engine in such manner that said motors may, either separately or combined, be used to propel the carriage. In the employment of this embodiment of the invention the oil-motor may be driven at such speed as to charge the cells through the electric motor, the latter then acting as a generator, and this may be done either when the carriage is moving at a comparatively slow speed or with the full power of the oil-motor when the carriage is stationary.

A desirable characteristic of the invention is that the essential features of the combination of the two motors may be retained whether the vehicle is mounted on four wheels or is of the tricycle order.

The invention possesses many features of advantage, and said invention with said features will be fully understood from the detailed description hereinafter presented, reference being had to the accompanying drawings, in which—

Figure 1:
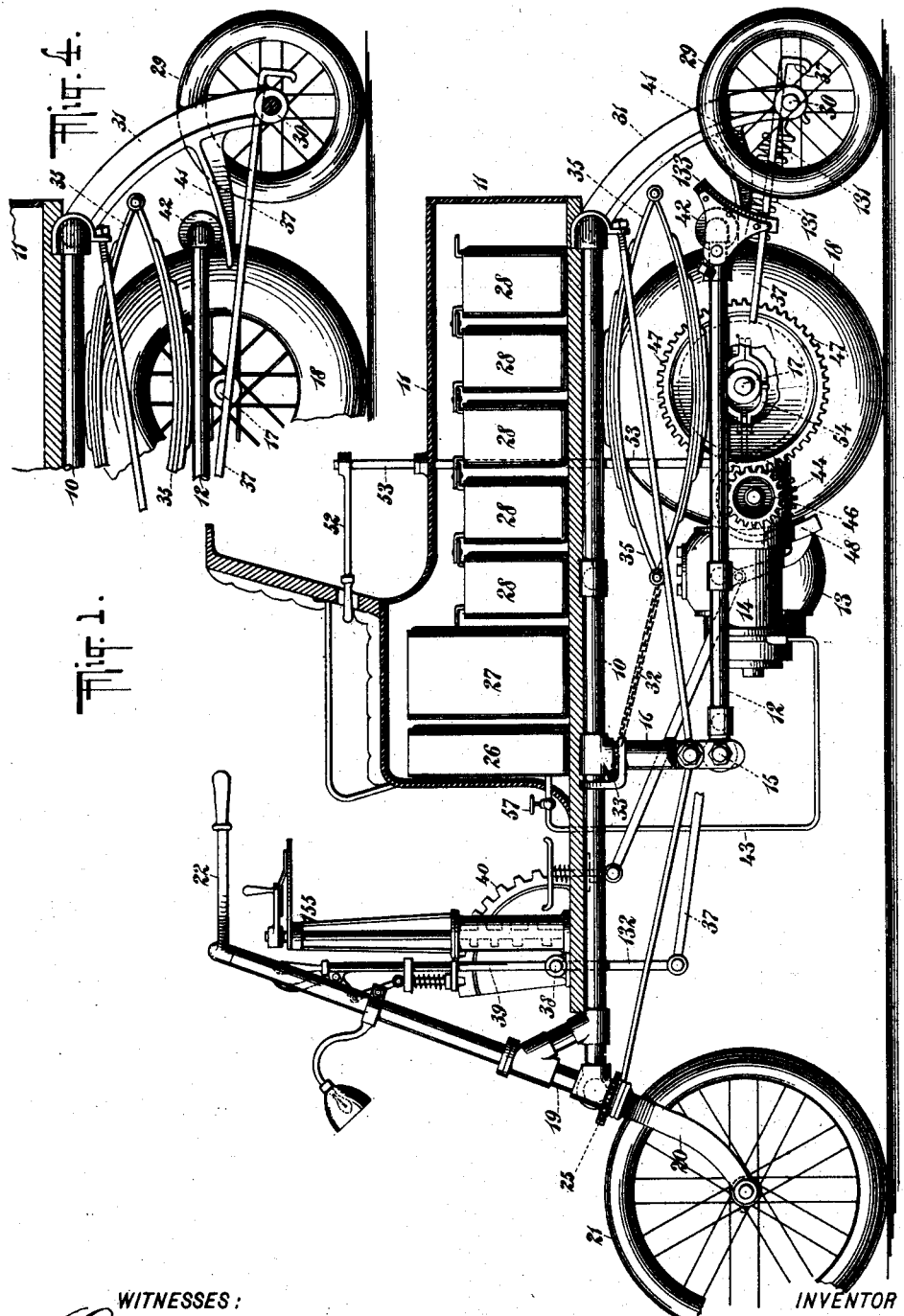
Figure 2:
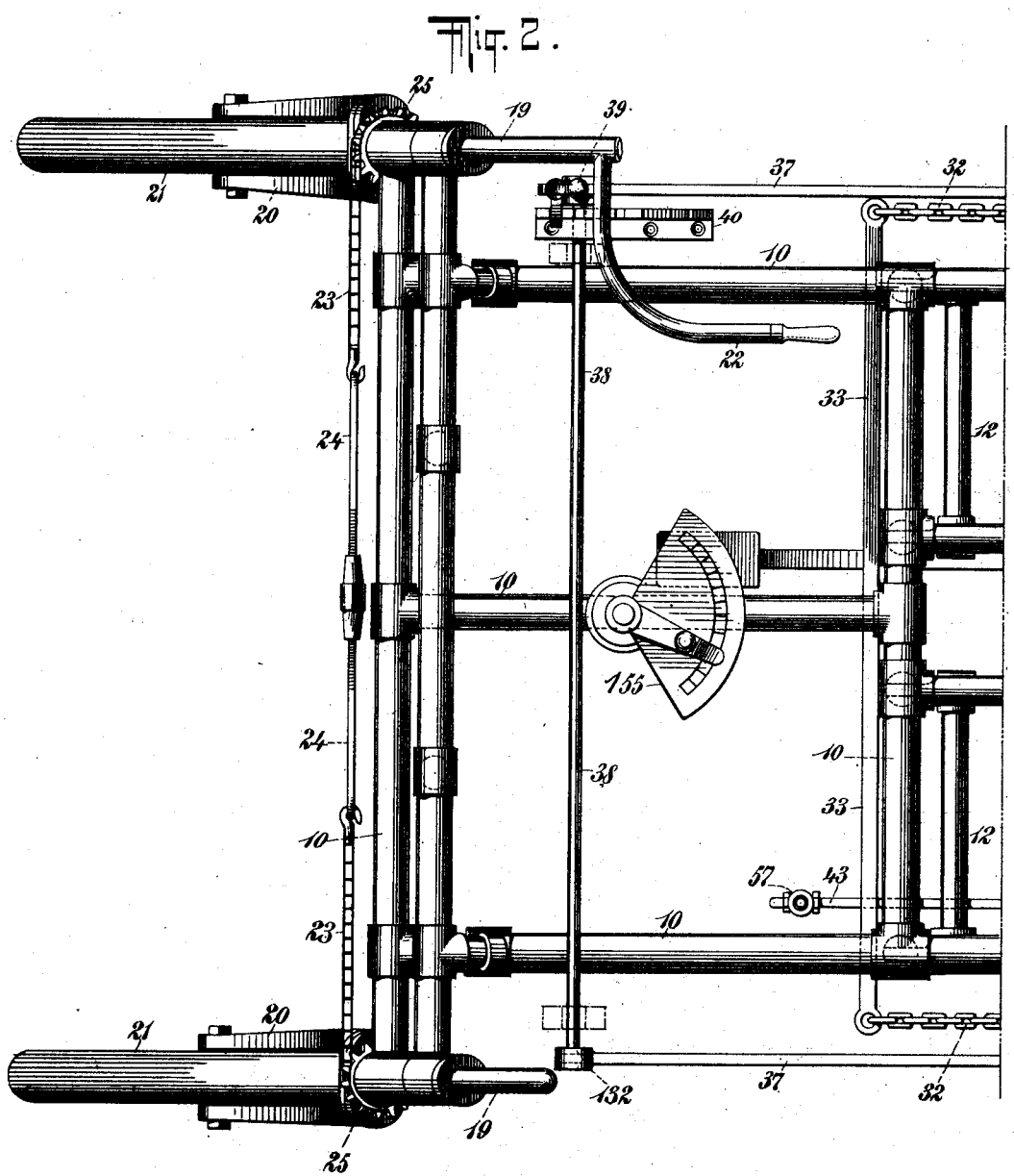
Figure 3:
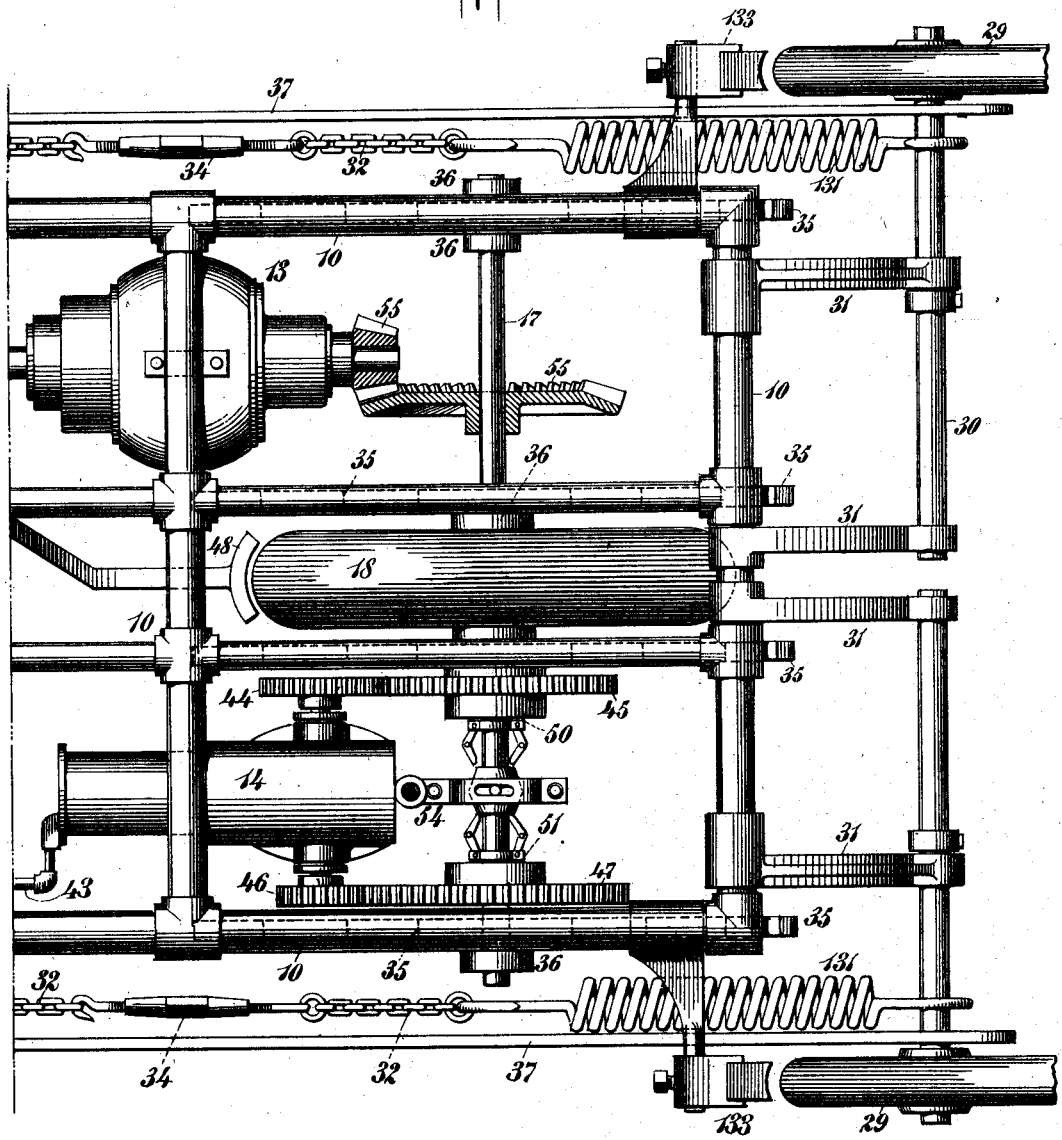

Figure 1 is a side elevation, partly in section, of a motor-vehicle constructed in accordance with and embodying the invention. Figs. 2 and 3, taken together, present a plan view, partly in section, of same, the body of the vehicle being omitted. Fig. 4 is a detached side elevation, partly in section, of the rear portion of the vehicle; and Fig. 5 is a detached top view of the framing of the vehicle and illustrating the application of the invention to a vehicle of the tricycle type.

The vehicle-frame comprises the main frame 10 to support the wagon-body 11 and the yielding auxiliary frame 12, which is below the frame 10 and serves to support the electric motor 13 and gasolene or hydrocarbon-oil engine or other motor 14. At its front end the frame 12 is secured in a hinged manner by bolts 15 to the hangers 16, which extend downward from the frame 10, as illustrated, and at its rear portion said frame 12 supports the transverse driving-shaft 17, upon the center of which is keyed or otherwise secured the driving-wheel 18.

The frames 10 and 12 are, as indicated, preferably, though not necessarily, formed of tubing, the sections of tubing being united by couplings in a well-known manner.

The frame 10 carries at its front end the rotatory shafts 19, having at their lower end the forks 20, which on usual axles receive the steering-wheels 21 21. One of the shafts 19 may be provided with a suitable handle 22 to aid in steering the vehicle, and said shafts are connected together and compelled to turn in unison by the chains 23 and rods 24, said rods connecting said chains and said chains being in engagement with the sprocket-wheels 25.

The wagon or vehicle body 11, supported by the frame 10, may be of any appropriate construction and design, and within its hollow interior portions, preferably beneath the seats, will be concealed the tank 26 for hydrocarbon oil, the tank 27 for water, and the cells 28 of the storage battery.

The rear end of the frame 10 is supported upon the rear wheels 29, whose axles 30 30 are mounted in the lower end of the oscillatory arms 31, swung from the rear end bar of the frame 10 in a hinged manner, there being two of the arms 31 for each axle 30 and one axle 30 for each wheel 29. The axles 30 are normally drawn toward a vertical position by the helical springs 131, whereby the wheels 29 are caused to support more or less of the weight of the upper frame 10 and wagon-body 11 (together with its load) directly on the ground. The springs 131 are at their rear end hooked on the axles 30 and at their front end are connected by chains 32 to the ends of the transverse rod 33 or to any suitable rigid part of the framing. The chains 32 have interposed in them the turnbuckles 34, whereby the chains may be lengthened or shortened and the force of the springs 131 varied accordingly. The part of the weight or load at the rear part of the vehicle which is not supported by the wheels 29 is taken by the springs 35, interposed between the frame 10 and hinged frame 12, and transmitted by said springs to the driving-wheel 18, whose shaft 17 is mounted in bearings (preferably ball-bearings) 36, secured to the frame 12.

It is desirable that the driving-wheel 18 be capable of being elevated above the ground and rotated without propelling the carriage, and thus the frame 12 is hinged and means are provided for elevating the rear end of said frame, said means in the present instance comprising the rods 37, resting at their rear ends on the axles 30 and connected at their front end to arms 132 of the transverse rock-shaft 38, to which the lever 39 is connected, said lever 39 being at its upper portion supplied with a suitable handle within reach of the driver and also with suitable detents to engage the notches in the quadrant 40. The lever 39 may be utilized for drawing the rods 37 forward or moving them rearward, and said detents and quadrant 40 are provided for locking said rods 37 and lever 39 in any position that may be given to them. The rear ends of the rods 37 are of hook shape, as shown in Fig. 1, so that said rods when drawn forward by the lever 39 may engage the axles 30 and pull the arms 31 forward more nearly to a vertical position and cause the cam projections 41 on said arms to ride below the antifriction-rollers 42 on the frame 12 and elevate the latter, thereby raising the driving-wheel 18 clear of the ground and causing the weight of the rear part of the wagon-body, with its load, to be supported wholly by the rear wheels 29. At opposite sides of the frame 12 I secure appropriate blocks 133 to check the wheels 29 on their forward movement under the action of the rods 37, the purpose of the blocks 133 being simply to prevent the wheels 29 from being pulled too far forward.

The oil-motor 14 will be fed from the tank 26 through a pipe 43, and said motor is connected by the gears 44 45 and gears 46 and 47 of different ratios with the shaft 17, said wheels 45 and 47 being in operative relation with the clutches 50 51, carried on the driving-shaft 17 and capable of being alternately operated by the driver through the medium of the handle-bar 52, vertical axially-rotatable rod 53, and clutch-lever 54, or by any other usual and convenient means. The clutches 50 51 are in themselves of usual character, and the invention is not confined to any special construction of these clutches or operating-levers.

The electric motor will be connected by gearing, such as bevel-gears 55, directly with the driving-shaft 17, as indicated in Fig. 3.

The present invention is not limited to any special character of electric connections for the cells 28 of the storage battery or for controlling the speed of the motor 13, but suitable connections of the kind well known in this art will be employed for these purposes. I illustrate diagrammatically in Fig. 1 a usual form of electric controller 155, which will be employed to control the speed of the motor 13 and to start, stop, and reverse said motor. The connections of this controller are made in the usual way between the cells 28 and the motor and are well known to those skilled in the art.

The operation of the automobile is as follows: The cells 28 being connected in the usual manner, the controller 155 is used to start the motor in the usual way, the motor running at different speeds, according as the cells are connected in series, or series parallel, or in parallel. To start the oil-motor, either of the clutches 50 51 at will, according to the speed desired, will be put in gear by the handle 52, operating through the vertical rod 53 and clutch-lever 54, and the oil or gasolene will be turned on by opening the valve 57 in the pipe 43, the latter leading the oil or gasolene from the tank 26 to the engine 14. As soon as the engine 14 starts in motion it assists or acts in conjunction with the electrical motor 13 in operating the driving-shaft 17 and driving-wheel 18. If the voltage of the motor is now reduced by putting it in series-parallel connection with the cells or in parallel, the motor will begin to act as a generator and charge the cells, because it is then being driven by the motor 14 faster than is necessary to counterbalance the voltage of the cells. If the lever 39 is now actuated so as to pull the arms 37 forward, the driving-wheel 18 will in the manner hereinbefore described be lifted out of contact with the ground and the carriage will remain stationary, and under such condition the whole power of the motor 14 will be expended in driving the electric motor 13 as a generator for charging the cells of the storage battery. The motor 13 always runs in the same direction, whether acting as a motor or a generator, in consequence of being shunt-wound. It will be evident that when both motors 13 14 are in operation if the speed is such as to drive the electric motor at such a rate that its counter electromotive force is greater than the voltage of the cells it will then begin to generate and charge the cells. This will take place when descending hills or on a level road when the voltage of the motor, or rather its counter electromotive force, becomes greater than the cells. The action of the two frames 10 12 together is such that the inequalities of the road will not interfere with the driving-wheel 18. The wheel 18 being swung with the frame 12 from the pivots or bolts 15 will always rest on the road-bed and have traction consequent upon its own weight and the weight of the two motors. If at any time this should not prove to be sufficient, more weight may be supplied by slackening the tension of the helical springs 131 and allowing more of the weight of the cells and passenger load to be taken by the carriage-springs 35. A suitable brake 48 will be provided for the wheel 18.

Fig. 5 is a top view of the frame portion of the vehicle and illustrates how the invention may be applied to a vehicle of the tricycle order. The construction shown in Fig. 5 is substantially the same as that illustrated in Fig. 1, with the exception that with respect to the construction of Fig. 5 but one steering-wheel is employed and one axle serves for both wheels 29.

In order to understand how the invention may be applied in a different form of vehicle of the tricycle order, it will only be necessary to consider that the rear wheels 29 and arms 31 are omitted from the structure shown in Figs. 1, 2, and 3, thus leaving the vehicle possessed for its support of the front wheels 21 and driving-wheel 18, the weight of the rear portion of the vehicle then coming upon the said driving-wheel 18 through the intermediate devices represented by the carriage-springs 35 and frame 12. The presence of the rear wheels 29 and arms 31 results, however, in certain advantages, since thereby a large vehicle may not only be well supported, but convenient means are always at hand for lifting the driving-wheel 18 clear of the road-bed. The invention is not, therefore, limited in every instance to the employment of the rear wheels 29 and arms 31, since their omission merely transforms the vehicle into one of a tricycle type without alteration in the construction or arrangement of the frames 10 and 12 or the parts carried by said frames.

What I claim as my invention, and desire to secure by Letters Patent, is—

1. In a motor-vehicle, the body-frame, the yielding auxiliary frame below the same, the driving-shaft carried by said auxiliary frame, and the driving traction-wheel on said shaft, combined with the electric motor carried by said auxiliary frame, the motor-engine also carried by said auxiliary frame, gearing for connecting said motors with said driving-shaft, and means, to be manually operated, for placing said motor-engine into or out of gear with said driving-shaft; substantially as set forth.

2. In a motor-vehicle, the body-frame, the yielding auxiliary frame below the same, the driving-shaft carried by said auxiliary frame, and the driving traction-wheel on said shaft, combined with the electric motor carried by said auxiliary frame, the motor-engine also carried by said auxiliary frame, gearing for connecting said motors with said driving-shaft, and means for varying the speed at which said motor-engine may, when in operation, drive said shaft; substantially as set forth.

3. In a motor-vehicle, the body-frame 10, the hinged frame 12 below the same, and the springs between said frames, combined with the driving-shaft 17 carried by said frame 12, the driving-wheel 18 on said shaft, the electric motor carried by said hinged frame, the motor-engine also carried by said hinged frame, and gearing for connecting said motors with said driving-shaft; substantially as set forth.

4. In a motor-vehicle, the body-frame 10, the hinged frame 12 below said frame 10, and the springs intermediate said frames, combined with the driving-shaft 17 carried by said frame 12, the driving-wheel 18 on said shaft, the electric motor carried by said frame 12 and connected by gearing with said shaft 17, the engine 14 carried by said frame 12 and having the gear-wheels 44 and 46 of different ratios, the clutch-sleeves 50 51, on said shaft 17 and provided with the gear-wheels 45, 47, engaging said gear-wheels 44, 46, and means for connecting either of said clutch-sleeves with said driving-shaft; substantially as set forth.

5. In a motor-vehicle, the body-frame 10 having at its front end the steering wheel or wheels and at its rear end the downwardly-extending arms 31, the axle 30 carried by said arms, and the rear wheels 29 on said axle, combined with the hinged frame 12 below said frame 10, the springs 35 intermediate said frames 10, 12, the driving-shaft 17 carried by said frame 12, the driving-wheel 18 on said shaft, the motor in operative connection with said driving-shaft, and means connected with said arms 31 for engaging and elevating the rear portion of said frame 12 for the purpose of elevating said driving-wheel 18 clear of the ground; substantially as set forth.

6. In a motor-vehicle, the body-frame 10 having the hinged arms 31 at the rear end of said frame 10 and carrying the rear wheels 29, combined with the hinged frame 12 below said frame 10, the driving-shaft 17 carried by said frame 12, the driving-wheel 18 on said shaft 17, the motor in operative connection with said driving-shaft 17, and means for moving said arms 31 into a more or less nearly vertical position for elevating or lowering the frame 10; substantially as set forth.

7. In a motor-vehicle, the body-frame 10 having the steering-wheels at its front end, the hinged arms 31 swung from the rear end of said frame 10, the axles 30 carried by said arms, and the rear wheels 29 on said axles, combined with the hinged frame 12 below said frame 10, the springs 35 intermediate said frames 10, 12, the driving-shaft 17 carried by said frame 12, the driving-wheel 18 on said shaft, the motor carried by said frame 12 and being in operative connection with said driving-shaft, the cam-arms 41 on said arms 31, and means for moving said arms 31 into a more nearly vertical position below the rear end of said frame 10 in order thereby to cause said arms 41 to engage and elevate the rear portion of the frame 12; substantially as set forth.

8. In a motor-vehicle, the body-frame 10 having steering wheel or wheels at its front end, the arms 31 swung from the rear end of said frame and carrying the wheels 29, and the hinged frame 12 below said frame 10, combined with the driving-shaft carried by said frame 12, the driving-wheel 18 on said shaft, the motor carried by said frame and in operative connection with said driving-shaft, the springs 131 connected with the axles of said rear wheels 29 for yieldingly resisting said axles, the rods 37 at one end adapted to engage said axles, and means within reach of the driver and connected with said rods 37, whereby the latter may be actuated for the purpose of moving said arms 31 into a more nearly vertical position below the rear portion of the frame 10 for elevating the latter; substantially as set forth.

9. In a motor-vehicle, the tubular body-frame 10 having at its front end the steering wheel or wheels, the hangers 16 suspended from said frame 10 adjacent to the forward portion of the same, and the tubular frame 12 hinged to said hangers and extending rearward below said frame 10, combined with the springs 35 intermediate said frames 10, 12, the driving-shaft carried by the rear portion of said frame 12, the driving-wheel 18 on said shaft, the electric motor carried by said frame 12 and geared to said driving-shaft, and the motor-engine also carried by said frame 10 and adapted to be operatively connected with said driving-shaft; substantially as set forth.

10. In a motor-vehicle, the body-frame 10, the front steering wheel or wheels, the hinged frame 12 below said body-frame, and the springs 35 intermediate said frames 10, 12, combined with the driving-shaft carried by said frame 12, the driving-wheel 18 thereon, the electric motor carried by said frame 12 and in operative connection with said driving-shaft, the motor-engine also carried by said frame 12, and connecting mechanism for placing said motor-engine into or out of gear with said driving-shaft; substantially as set forth.

11. In a motor-vehicle, the body-frame, the yielding auxiliary frame 12 below the same, and springs intermediate said frames, combined with the driving-shaft carried by said frame 12, the driving traction-wheel on said shaft, the motor in operative connection with said shaft, and means for adjusting the relation of the rear portion of the vehicle with respect to the proportion of the weight of same it may be desired shall be taken by said auxiliary frame; substantially as set forth.

12. In a motor-vehicle, the body-frame, the yielding auxiliary frame below the same, the driving-shaft carried by said auxiliary frame, and the driving traction-wheel on said shaft, combined with the electric motor carried by said auxiliary frame, the motor-engine also carried by said auxiliary frame, and gearing for connecting said motors with said driving-shaft; substantially as set forth.

13. In a motor-vehicle, the driving-shaft, and the driving traction-wheel on said shaft, combined with the electric motor, the gears permanently connecting said motor with said shaft, the motor-engine, the gears 45, 47, and clutches 50, 51 on said driving-shaft, the gears 44, 46, on said motor-engine and adapted to coöperate with said gears 45, 47, and means, to be manually operated, for placing said motor-engine into and out of gear with said driving-shaft and for varying the speed at which said motor-engine may, when in operation, drive said shaft; substantially as set forth.

14. In a motor-vehicle, the driving-shaft, and the driving traction-wheel centrally on said shaft, combined with the electric motor, gears connecting said motor with said driving-shaft at one side of said traction-wheel, the motor-engine, differential gearing for connecting said engine with said driving-shaft at the other side of said traction-wheel, and means, to be manually operated, for placing said motor-engine into and out of gear with said driving-shaft and for varying the speed at which said motor-engine may, when in operation, drive said shaft; substantially as set forth.

15. In a motor-vehicle, the driving-shaft and the driving traction-wheel centrally disposed thereon, combined with the shunt-wound electric motor, gears connecting said motor with said shaft at one side of said traction-wheel, the prime motor, gearing connecting said prime motor with said driving-shaft at the other side of said traction-wheel, and means, to be manually operated, for placing said prime motor into and out of gear with said driving-shaft; substantially as set forth.

Signed at New York, in the county of New York and State of New York, this 12th day of June, A. D. 1900.

DAVID N. MELVIN.

Witnesses:
CHAS. C. GILL,
GUNDER GUNDERSON.